Patented July 11, 1950

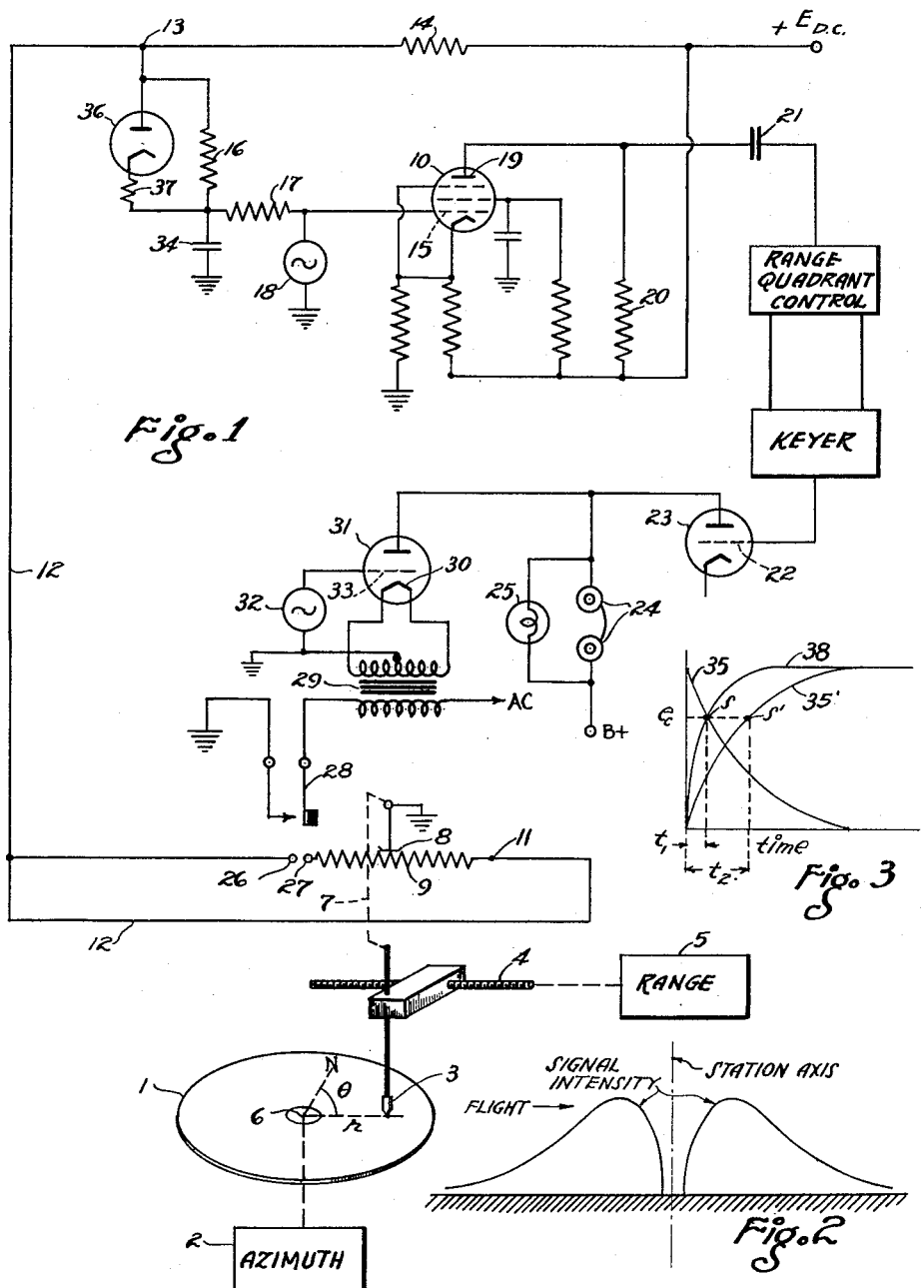

2,514,602

UNITED STATES PATENT OFFICE 2,514,602

TRAINING APPARATUS FOR SIMULATING RADIO RANGE SIGNALS

Paul E. Grandmont, East Orange, N. J., assignor to Curtiss-Wright Corporation, a corporation of Delaware Application September 30, 1947, Serial No. 776,945

8 Claims. (Cl. 35—10.2)

This invention relates to flight navigation training, and particularly to training apparatus for simulating radio range signals as they are received in the close vicinity of the radio range transmitting station.

The reception of radio range signals in an aircraft when the flight passes over a radio range station varies in a well known manner from a rapid fade-out of the signals when closely approaching the station to a period of silence, after which the signals surge in loudly as the flight continues past the station. This region of no signal reception is generally known as the "cone-of-silence" and it is an object of this invention to provide improved means for more realistically simulating the fade-out and build-up of the signals at the cone.

A further object of the invention is to provide improved electronic means particularly adapted for ground trainers for simulating radio range signal reception in an aircraft that is flying over a radio range station.

The invention will be more fully set forth in the following description referring to the accompanying drawing, and the features of novelty will be pointed out with particularity in the claims annexed to and forming a part of this specification.

Referring to the drawing, Fig. 1 is a partly schematic layout illustrating diagrammatically an embodiment of the present invention for simulating reception of radio range signals on the range and at the cone-of-silence;

Fig. 2 diagrammatically illustrates the intensity of signal reception at the boundaries of the cone-of-silence; and Fig. 3 illustrates R-C damping circuit characteristics.

Referring to Fig. 1, flight simulating apparatus is represented by the rotatable circular chart 1 that is suitably positioned as by a motor 2 operable according to change in azimuth of the simulated flight, and a tracing pen 3 that is movable linearly on a lead screw 4 by servomotor means generally indicated at 5 according to change in distance from the instant flight position to the radio range station represented by the center point 6 of the chart. The pen tracing on the chart represents the flight path on the radio range with respect to the radio range station and the bearing of the aircraft from the station is angle $\theta$ measured from a north-reference position on the chart. The control of the azimuth and range motors 2 and 5 may be either automatic or according to operation of simulated flight controls by the student or under the supervision of an instructor. A description thereof is unnecessary for a complete understanding of the present invention, it being sufficient to state that as the azimuth bearing $\theta$ and range $r$ of the simulated flight vary with respect to the radio station, the chart and pen are positioned accordingly so as to establish the instant flight position. In this type of polar coordinate charting apparatus, the range value $r$ is always positive so that when the simulated flight path passes through the center of the chart, the pen reverses in direction and the chart is rotated 180° so that the trace on the chart surface is continuous.

The position of the range pen 3 is used to control the intensity of the radio range signals as the distance to the station increases or decreases and to this end the pen is mechanically connected in a suitable manner as indicated at 7 to a slider contact 8 that is grounded and engages a range potentiometer 9 for controlling a range signal circuit hereinafter described.

In practice the radio range signals sent from a station are coded so as to represent respective A and N quadrants of the radio range and this information is used by the pilot for orienting his position on the range. Apparatus for simulating this part of the signal system is represented by the parts marked "range quadrant control" and "keyer" and is shown in U. S. Patent No. 2,366,603 granted January 2, 1945 to Richard C. Dehmel for Aircraft Training Apparatus. This equipment therefore need not be described in detail for a complete understanding of the present invention.

The normal operation of the apparatus of Fig. 1 for simulating radio range signals when the aircraft is some distance from the station, as indicated by the pen position on the chart, will first be described. For the simulated flight position shown a part of the range potentiometer resistance is connected in the grid control circuit of pentode 10 energized from the positive D. C. source $+E_{dc}$ which includes the grounded slider contact 8, that part of the potentiometer resistance between the slider and the potentiometer terminal 11, conductor 12, junction 13 and resistance 14. The control grid 15 of the pentode is connected to the junction point 13 through resistances 16 and 17, the tube being biased to cut-off when there is no D. C. potential on the grid. The pentode 10 is of the well known "variable-mu" type for more closely simulating the variable intensity of signal reception throughout the range. As the pen approaches the center of the chart, the potential on the grid of this tube rises, thus increasing its gain and the magnitude of its output. Motion away from the chart center produces a decrease in signal intensity in the same fashion.

The radio signal frequency source comprises an oscillator 18 that is adjusted to the standard range signal frequency (1020 cycles) and is directly connected to the control grid 15. The plate or output circuit of the pentode includes the anode 19 and a load resistor 20 to which is connected through a condenser 21 the range quadrant control and keyer as indicated. The keyer is connected in turn to the control grid 22 of a signal amplifying triode 23, the plate circuit of which is connected to the pilot's headphones 24 and to the source of plate potential B+. An indicating lamp 25 may be connected in shunt with the headphones to provide visual signals.

From the above description it will be readily seen that as the slider 8 moves toward the right to simulate flight away from the station the potential at junction 13, i. e. the pentode control grid signal, decreases since the potential approaches that of the grounded slider causing decrease in the intensity of signal reception at the headphones 24. Conversely, when the flight approaches the station the slider 8 cuts in more potentiometer resistance thereby raising the potential at junction 13 and causing louder range signals. As the slider continues to move toward the left, i. e., toward the station position, more of the potentiometer resistance is inserted in the control circuit until the slider engages and bridges a pair of fixed spaced contacts 26 and 27 that are connected respectively to opposite terminals of the potentiometer. The potentiometer is thus shunted to represent a flight position at the cone-of-silence, and the junction 13 as in the case of an extreme distance position is grounded so that its potential is zero. Accordingly no signal is received at the headphones. The spacing of the contacts with respect to the slider may readily be adjusted to provide adjustment of the length of time, such as two or three seconds, for flight through the cone.

At the exact center of the cone a positive Z signal may be simulated by means of the switch 28 that is closed by the pen mechanism at the center position, this switch being adapted to energize a transformer 29 for in turn energizing the cathode 30 of a triode 31. An oscillator 32 that is adjusted to the Z signal frequency is connected to the triode grid 33 and the plate circuit is connected to the headphones 24 for receiving the Z signal.

The signal fade-out as the flight enters the cone is an important characteristic of radio range signal reception and the pilot should be able to distinguish it from ordinary radio fade-out during poor reception. Referring to Fig. 2 which illustrates a typical cone-of-silence and assuming direction of flight as indicated by the arrow, the signal in practice builds up to considerable volume very near the station and then abruptly drops off generally as indicated. This characteristic is suitably simulated according to my invention by means of an R-C damping circuit including the resistance 16 and a condenser 34 that is connected between the junction of the resistances 16 and 17 and ground. Therefore when the slider 8 grounds the junction 13, the junction potential instead of immediately dropping to zero follows the damping circuit exponential characteristic curve 35 as illustrated by Fig. 3.

After reaching the cone center and assuming that the flight is continuous, the slider 8 then moves in the reverse direction and after passing through the cone inserts more potentiometer resistance in the circuit according to increased range. However, if the above described R-C damping circuit were relied upon solely to provide the signal build-up characteristic as the flight leaves the cone, this characteristic would generally resemble the curve 35' of Fig. 3 which is the counterpart of curve 35 and there would be considerable discrepancy between the rates of signal fade-out and build-up thus making the signal reception unrealistic. This will be apparent from an inspection of Fig. 3 showing that the drop in grid bias voltage $e_c$ along curve 35 to a point $s$ representing the lower limit of the audible signal takes place within a period of $t_1$ whereas a much greater time $t_2$ is required to reach the audible signal $s'$ on the build-up curve 35'.

For the purpose of more evenly balancing the fadeout and build-up characteristic curves there is provided thermionic means such as a diode 36 connected in parallel with the high resistance 16 as illustrated so as to be non-conducting when the condenser is discharging to ground during the signal fade-out. Thus the asymmetrical conductor or diode 36 simply represents a rectifier with an infinite resistance in shunt with the resistance 16 and therefore has no effect on the fade-out characteristic. However when the condenser starts to charge during the signal build-up, as where the junction 13 has a definite positive potential, the diode 36 becomes conducting and passes current through the low resistance 37 in parallel with the comparatively high resistance 16. This changes the characteristic of the new R-C damping circuit so that the rate of signal build-up may be much higher as indicated by the curve 38 of Fig. 3. The characteristic of this curve is chosen so that approximately the same time $t_1$ is required to build up to the audible signal point $s$, thereby bringing the cone into better balance from the standpoint of the pilot.

Accordingly, it will be seen that in effect two R-C damping circuits having different predetermined characteristics automatically function as needed to simulate approximately symmetrical fade-out and build-up of the range signals at the cone of silence in realistic manner.

It should be understood that this invention is not limited to specific details of construction and arrangement thereof herein illustrated, and that changes and modifications may occur to one skilled in the art without departing from the spirit of the invention.

What is claimed is:

1. In flight training apparatus for teaching radio range navigation, an electrical network for simulating signal reception at the cone-of-silence of the range comprising a source of signal current, current modulating means therefor, and an aural signal receiver responsive to the modulated signal current, said modulating means including a circuit controlling device for varying the signal current according to simulated flight positions, a damping circuit for controlling the rate of current decay so as to simulate fade-out of the range signals upon entering the cone and means electrically associated with said damping circuit and responsive to build-up of the signal current for changing the characteristic of said damping circuit thereby controlling the rate of build-up of signal current so as to simulate the in-surge of range signals upon leaving the cone.

2. In flight training apparatus for teaching radio range navigation, an electrical network for simulating signal reception at the cone-of-silence of the range comprising a source of signal current, current modulating means therefor, and an aural signal receiver responsive to the modulated signal current, said modulating means including a circuit controlling device for varying the signal current according to simulated flight positions at opposite edges of the cone-of-silence, a damping circuit for controlling the rate of current decay so as to simulate fade-out of the range signals upon entering the cone and asymmetrical conducting means connected to said damping circuit for changing the characteristic of said damping circuit and controlling the rate of build-up of signal current so as to simulate the in-surge of range signals upon leaving the cone.

3. In flight training apparatus for teaching radio range navigation, means for simulating signal reception at the cone-of-silence of the range comprising a source of signal current, current modulating means therefor, and a signal receiver responsive to the modulated signal current, said modulating means including means for controlling the signal current according to simulated flight positions at the opposite edges of the cone-of-silence, a resistance-capacitance damping circuit for controlling the rate of current decay so as to simulate fade-out of the range signals upon entering the cone and asymmetric conducting means connected to and arranged to by-pass at least a part of said damping circuit for changing the characteristic of said damping circuit and controlling the rate of build-up of signal current so as to simulate the in-surge of range signals upon leaving the cone.

4. In flight training apparatus for teaching radio range navigation, means for simulating signal reception at the cone-of-silence of the range comprising a source of signal current, current modulating means therefor, and a signal receiver responsive to the modulated signal current, said modulating means including means for controlling the signal current according to simulated flight positions at opposite edges of the cone-of-silence, a resistance-capacitance damping circuit for controlling the rate of current decay so as to simulate fade-out of the range signals upon entering the cone and thermionic means connected in parallel with resistance of said circuit for changing the characteristic thereof and controlling the rate of build-up of signal current so as to simulate the in-surge of range signals upon leaving the cone.

5. In flight training apparatus for teaching radio range navigation, means for simulating signal reception at the cone-of-silence of the range comprising a source of signal current, current modulating means therefor, and a signal receiver responsive to the modulated signal current, said modulating means including means for controlling the signal current according to simulated flight positions at opposite edges of the cone-of-silence, a resistance-capacitance damping circuit operable upon de-energizing of the signal circuit for controlling the rate of current decay so as to simulate fade-out of the range signals upon entering the cone and a rectifier connected in parallel with resistance of said damping circuit and operable only upon energizing of said signal circuit for changing the characteristic of said damping circuit and controlling the rate of build-up of signal current so as to simulate the in-surge of range signals upon leaving the cone.

6. In flight training apparatus for teaching radio range navigation, means for simulating signal reception on the range and at the cone-of-silence of the range comprising a source of signal current, current modulating means therefor, and an aural signal receiver responsive to the modulated signal current, said modulating means including a circuit controlling device for varying the signal current according to simulated flight positions, a damping circuit, an impedance connected to said circuit variable according to the decay or build-up of signal current for changing the characteristics of said circuit and controlling the rate of current decay so as to simulate fade-out of the range signals upon entering the cone and controlling the rate of build-up of signal current so as to simulate the in-surge of range signals upon leaving the cone, and thermionic means of the variable-mu type responsive to said signal current for controlling the energization of said signal receiver for simulating normal range signal reception.

7. In flight training apparatus for teaching navigation with respect to a radio range station, an electrical network for simulating signal reception at the cone-of-silence of the range comprising a source of signal current, current modulating means therefor, and a signal receiver responsive to the modulated signal current, said modulating means including a potentiometer operable according to distance of the simulated flight from the radio station for varying or cutting off the signal current, a resistance-capacitance damping circuit operable upon de-energization of the signal circuit for controlling the rate of current decay so as to simulate fade-out of the range signals upon entering the cone and a circuit having resistance and asymmetric conducting means connected in shunt with resistance of said damping circuit and arranged to conduct when the condenser of said damping circuit is charging for changing the characteristic of said damping circuit and thereby controlling the rate of build-up of signal current so as to simulate the in-surge of range signals upon leaving the cone.

8. In flight training apparatus for teaching navigation with respect to a radio range station, an electrical network for simulating signal reception at the cone-of-silence of the range comprising a source of signal current, current modulating means therefor, and a signal receiver responsive to the modulated signal current, said modulating means including a grid controlled device, a potentiometer energized from a D. C. source and operable according to distance of the simulated flight from the radio station for varying or cutting off signal voltage to said grid device according to simulated flight positions on the range or at opposite edges of the cone-of-silence respectively, a resistance-capacitance damping circuit connected to and operable upon de-energization of the grid signal circuit for controlling the rate of current decay so as to simulate fade-out of the range signals upon entering the cone and means electrically connected to said damping circuit and responsive to and dependent upon the potential of said damping circuit for changing the characteristic of said damping circuit and thereby controlling the rate of build-up of signal current so as to simulate the in-surge of range signals upon leaving the cone.

PAUL E. GRANDMONT.

REFERENCES CITED

The following references are of record in the file of this patent:

UNITED STATES PATENTS

| Number | Name | Date |
|---|---|---|
| 2,352,216 | Melvin | June 27, 1944 |
| 2,366,603 | Dehmel | Jan. 2, 1945 |
| 2,389,359 | Grow | Nov. 20, 1945 |
| 2,417,229 | Alexanderson | Mar. 11, 1947 |
| 2,435,502 | Lang | Feb. 3, 1948 |
| 2,438,126 | Muller | Mar. 23, 1948 |
| 2,460,511 | Lang | Feb. 1, 1949 |